United States Patent
Heinrich et al.

(10) Patent No.: US 9,497,232 B2
(45) Date of Patent: Nov. 15, 2016

(54) METHOD FOR ESTABLISHING AN IP-BASED COMMUNICATIONS CONNECTION BETWEEN AN ELECTRIC VEHICLE AND A CHARGING CONTROL UNIT

(75) Inventors: Andreas Heinrich, Boeblingen (DE); Joerg Heuer, Oberhaching (DE)

(73) Assignee: Siemens Aktiengesellschaft, Munich (DE)

( * ) Notice: Subject to any disclaimer, the term of this patent is extended or adjusted under 35 U.S.C. 154(b) by 307 days.

(21) Appl. No.: 14/112,949

(22) PCT Filed: Apr. 11, 2012

(86) PCT No.: PCT/EP2012/056502
§ 371 (c)(1),
(2), (4) Date: Oct. 21, 2013

(87) PCT Pub. No.: WO2012/143266
PCT Pub. Date: Oct. 26, 2012

(65) Prior Publication Data
US 2014/0036989 A1    Feb. 6, 2014

(30) Foreign Application Priority Data
Apr. 21, 2011   (DE) .................. 10 2011 007 912

(51) Int. Cl.
*H04L 29/06*     (2006.01)
*B60L 11/18*     (2006.01)
(Continued)

(52) U.S. Cl.
CPC .......... *H04L 65/1069* (2013.01); *B60L 11/182* (2013.01); *B60L 11/1818* (2013.01);
(Continued)

(58) Field of Classification Search
CPC .................................................. H04L 65/1069
(Continued)

(56) References Cited

U.S. PATENT DOCUMENTS

2002/0158749 A1*  10/2002  Ikeda ...................... B60L 3/00
                                                                340/5.74
2005/0063363 A1*   3/2005  Lazar ...................... H04B 3/54
                                                                370/352
(Continued)

FOREIGN PATENT DOCUMENTS

DE    102009025302 A1    12/2010
DE    102009043380 A1     4/2011
(Continued)

OTHER PUBLICATIONS

Käbisch, S. , et al., "Interconnections and Communications of Electric Vehicles and Smart Grids", 2010, pp. 161-166, First IEEE International Conference on Smart Grid Communications (SmartGridComm).
(Continued)

*Primary Examiner* — Parth Patel
(74) *Attorney, Agent, or Firm* — Laurence Greenberg; Werner Stemer; Ralph Locher

(57) ABSTRACT

A method establishes an IP-based communications connection between an electric vehicle and a charge control unit associated with a charging station assigned an IP address. The electric vehicle is connected to the charging station via a charging cable and/or an inductive charge coupling for charging and/or discharging. A first communication connection that can be used exclusively by the electric vehicle and the charging station is provided via the charging cable and/or the inductive charging coupling. The electric vehicle having the charging control unit and the charging infrastructure can communicate via a second communications connection that can be used in parallel by other electric vehicles and charge
(Continued)

control units. An identification is provided to the electric vehicle and the charging control unit. An IP-based communication is established between the electric vehicle and the charging control unit, using the IP address.

26 Claims, 5 Drawing Sheets

(51) Int. Cl.
    H02J 7/00       (2006.01)
    H04B 3/54       (2006.01)
    H04L 29/12      (2006.01)
(52) U.S. Cl.
    CPC ........ B60L 11/1844 (2013.01); B60L 11/1846 (2013.01); H02J 7/0052 (2013.01); H04B 3/544 (2013.01); H04L 61/2007 (2013.01); B60L 2240/70 (2013.01); Y02B 90/2692 (2013.01); Y02E 60/721 (2013.01); Y02T 10/7005 (2013.01); Y02T 10/7072 (2013.01); Y02T 10/7291 (2013.01); Y02T 90/121 (2013.01); Y02T 90/122 (2013.01); Y02T 90/128 (2013.01); Y02T 90/14 (2013.01); Y02T 90/16 (2013.01); Y02T 90/163 (2013.01); Y02T 90/169 (2013.01); Y04S 10/126 (2013.01); Y04S 30/14 (2013.01); Y04S 40/146 (2013.01)
(58) Field of Classification Search
    USPC .................................. 375/238, 257; 320/109
    See application file for complete search history.

(56) References Cited

U.S. PATENT DOCUMENTS

| 2008/0012534 | A1* | 1/2008 | Bucur ................ G01R 31/3658 320/136 |
| 2008/0039979 | A1* | 2/2008 | Bridges ............... B60L 11/1816 700/292 |
| 2008/0039980 | A1* | 2/2008 | Pollack ............... B60L 11/1824 700/295 |
| 2008/0039989 | A1* | 2/2008 | Pollack ............... B60L 11/1811 701/22 |
| 2008/0040223 | A1* | 2/2008 | Bridges ............... B60L 11/1816 705/14.69 |
| 2008/0040263 | A1* | 2/2008 | Pollack .................. G06Q 20/10 705/39 |
| 2009/0251300 | A1* | 10/2009 | Yasuda ............... B60L 11/1816 340/426.1 |
| 2010/0079004 | A1* | 4/2010 | Keefe ................. B60L 11/1842 307/80 |
| 2010/0082464 | A1* | 4/2010 | Keefe .................... G06Q 10/06 705/32 |
| 2010/0161517 | A1* | 6/2010 | Littrell ............... B60L 11/1809 705/412 |
| 2011/0061014 | A1* | 3/2011 | Frader-Thompson . G01D 4/002 715/771 |
| 2011/0099144 | A1* | 4/2011 | Levy ................... B60L 11/1824 707/609 |
| 2011/0251753 | A1* | 10/2011 | Saito .................. B60L 11/1816 701/31.4 |
| 2011/0285349 | A1* | 11/2011 | Widmer ................ B60L 11/182 320/108 |
| 2012/0126995 | A1* | 5/2012 | Sobotka ................. G01D 4/002 340/870.03 |
| 2012/0263242 | A1* | 10/2012 | Heuer ................. B60L 11/1818 375/257 |
| 2013/0099744 | A1* | 4/2013 | Falk .................... B60L 11/1816 320/109 |
| 2013/0127400 | A1* | 5/2013 | Oh ......................... B60L 11/14 320/104 |
| 2014/0159658 | A1* | 6/2014 | Kiceniuk, Jr. ...... B60L 11/1816 320/109 |

FOREIGN PATENT DOCUMENTS

| WO | 2005029710 A2 | 3/2005 |
| WO | 2009098687 A2 | 8/2009 |
| WO | WO 2010146015 | * 12/2010 |
| WO | 2011044543 A2 | 4/2011 |

OTHER PUBLICATIONS

GE Industrial, "EV Charging Station User Manual & Installation Instruction", Jan. 1, 2010, pp. 1-86, XP002681353, URL: http:_// www.geindustrial.com/publibrary/checkout/DEH-44160?TNR=Installation%20and%20Instruction|DEH-44160|generic.

* cited by examiner

METHOD FOR ESTABLISHING AN IP-BASED COMMUNICATIONS CONNECTION BETWEEN AN ELECTRIC VEHICLE AND A CHARGING CONTROL UNIT

BACKGROUND OF THE INVENTION

Field of the Invention

The invention relates to a method for establishing an IP-based communications connection between an electric vehicle and a charging control unit and to a corresponding system for establishing this communications connection. The invention also relates to an electric vehicle and to a charging station.

In recent years, work has been increasingly carried out on the development of electric vehicles and on a corresponding infrastructure for charging the energy stores of electric vehicles. In order to charge and possibly also to discharge such an energy store, it is necessary to establish a charging connection between the electric vehicle and a charging station with the aid of a charging cable. In this case, it is desirable to standardize this charging connection. In addition to supplying charging current, this connection is also intended to enable communication between a vehicle and a charging station.

Fundamental signaling for controlling charging between a charging station and an electric vehicle on the basis of pulse width modulation is described within the scope of Part 1 of the ISO/IEC 61851 standard which is still in development. In this case, a so-called pilot line which is routed in the charging cable is used for signaling.

In addition to the communications connection via the pilot line, work is also being carried out on a communications connection based on PLC technology (PLC=Power Line Communication) within the scope of the development of the further ISO/IEC 15118 standard. This communications connection is intended to allow broadband information transmission between an electric vehicle and a charging station or a charging control unit assigned to the charging station via a line which is not separately shielded and/or a current-carrying line in the charging cable. Communication is IP-based (IP=Internet Protocol) in this case and takes place on layer 3 of the OSI reference model. In this case, different variants of IP can be used, for example IPv6 or possibly also IPv4. However, in contrast to the pilot line, strong crosstalk effects may arise between individual charging connections, with the result that, under certain circumstances, it is no longer possible to uniquely assign the electric vehicle to the charging station via the PLC communications connection. The PLC communications connection between electric vehicles and charging stations is therefore comparable to a so-called "shared medium" which can be used to transmit information to a plurality of electric vehicles and/or charging stations.

The above problem arises not only during communication via a current-carrying line in the charging cable but also when PLC communication is established using other lines between an electric vehicle and a charging station/charging control unit or wireless types of communication are used to interchange information, for example WLAN.

BRIEF SUMMARY OF THE INVENTION

The object of the invention is therefore to provide a method for establishing an IP-based communications connection between an electric vehicle and a charging control unit, in which the electric vehicle is associated with the charging control unit used to charge and/or discharge the vehicle.

This object is achieved by means of the independent patent claims. Developments of the invention are defined in the dependent claims.

Within the scope of the method according to the invention, an IP-based communications connection is established between an electric vehicle and a charging control unit. In this case, the charging control unit is assigned to a charging station, that is to say the charging station contains a corresponding item of information relating to which charging control unit is to be used for the vehicle during charging/discharging via the charging station. An IP address is also allocated to the charging control unit. In this case, the charging control unit and the charging station are part of a charging infrastructure which uses a corresponding backbone network to enable communication between different charging stations or central services and also to ensure that current is provided for the charging stations.

In order to carry out the method according to the invention, the electric vehicle is connected to the charging station via a charging cable and/or inductive charge coupling for the purpose of charging and/or discharging an energy store of the electric vehicle, a first communications connection which can be used solely by the electric vehicle and the charging station being provided via the charging cable and/or the inductive charge coupling, and the electric vehicle being able to communicate with the charging control unit and the charging infrastructure via a second communications connection. In contrast to the first communications connection, the second communications connection can be used in a parallel manner by other electric vehicles and charging control units. It is therefore the communications connection via a "shared medium" which has already been described above.

Within the scope of the method according to the invention, in a step a), the electric vehicle and the charging control unit are provided with an identification via the first communications connection. In a step b), an IP address is also allocated to the electric vehicle. Finally, in a step c), IP-based communication is set up between the electric vehicle and the charging control unit via the second communications connection with the aid of the IP address allocated to the electric vehicle and the identification provided via the first communications connection. In this case, mechanisms which are known per se can be used to set up IP-based communication. In particular, communication is established using a TCP/TLS set-up.

The method according to the invention is distinguished by the fact that the first communications connection is first of all used to provide a unique identification which is known to both the electric vehicle and the charging control unit. This identification is then used to establish IP-based communication. Since the first communications connection ensures a unique association between the electric vehicle and the charging station and therefore also between the electric vehicle and the charging control unit, it can be ensured, by using this identification when setting up IP-based communication, that the electric vehicle is also associated with the correct charging control unit to be used during the charging operation.

In one preferred embodiment of the method according to the invention, in step b), the IP address is allocated to the electric vehicle by the charging infrastructure via the second communications connection and is transmitted to the electric vehicle.

The charging control unit is preferably part of the charging station. In this case, the term "charging station" can be used synonymously with the term "charging control unit". However, if necessary, it is also possible to use a charging control unit which is arranged away from the charging station and is arranged, for example, at a different location of the charging infrastructure for the IP-based communications connection. In this case, a component other than the charging control unit used for the second communications connection is used when establishing the first communications connection. In this case, this component is preferably integrated in the charging station and may likewise constitute a (different) charging control unit.

The above-described first communications connection preferably provides the identification by means of pulse width modulation, in particular on the basis of Part 1 of the ISO/IEC 61851 standard already mentioned above. In one particularly preferred embodiment, the technology described in the German patent application 10 2009 051 401.5 is used to code the identification within the PWM signal. The entire disclosure content of said patent application is incorporated in the present application by reference. In this case, the identification in the PWM signal is preferably achieved by means of amplitude modulation of the low level of the signal. In contrast, the high level of the signal is used to transmit vehicle states to the charging station or charging control unit.

In one variant of the method according to the invention, the first and second communications connections can be provided via the same line in the charging cable. In this case, it is possible to use, for example, the line which is used to transmit the above-described PWM signal. This line is then used both by the first communications connection and by the second communications connection, in which case the signals from the two communications connections can be distinguished from one another by means of suitable modulation, for example.

The second communications connection described above is preferably the PLC communications connection already described at the outset, with PLC communication being defined in various standards, in particular Homeplug AV and Homeplug GP of the Homeplug Alliance and ITU 9955 and IEEE 1902. This PLC communication is intended for information transmission via current-carrying lines but may also be implemented using non-current-carrying lines. However, PLC communication in a current-carrying line of the charging cable is preferably used within the scope of the invention.

Nevertheless, if necessary, it is also possible to effect PLC communication via the line used to transmit the above-described PWM signal according to the first communications connection.

In another variant of the method according to the invention, the second communications connection is based on a wireless transmission method, for example IEEE 802.11 (WLAN) or IEEE 802.15.4 (ZigBee).

Within the scope of step b) of the method according to the invention, mechanisms which are known per se can be used to allocate an IP address to the electric vehicle. In particular, DHCP (DHCP=Dynamic Host Configuration Protocol) and/or SLAAC (SLAAC=Stateless Address Auto Configuration) can be used.

In one particularly preferred embodiment of the method according to the invention, the identification is provided in step a) in such a manner that the identification is originally stored in the electric vehicle and is transmitted from the electric vehicle to the charging control unit. In one preferred variant of this embodiment, the electric vehicle also sends the identification transmitted to the charging control unit in step a) via the second communications connection, whereupon the charging control unit, to which the identification was transmitted in step a), upon receiving the identification, (solely) transmits its IP address to the electric vehicle, for example using a broadcast, in which case the transmitted IP address is used to set up IP-based communication. In another variant, the charging control unit sends the identification transmitted to it in step a), together with its IP address, to the electric vehicle via the second communications connection, whereupon the electric vehicle transmits a response to the charging control unit. This response also contains, in particular, the IP address of the electric vehicle. In this case, the IP address transmitted to the electric vehicle is used to set up IP-based communication.

In addition to the above-described variant of the method according to the invention, it is also possible for the identification to be originally stored in the charging control unit and to be transmitted from the charging control unit to the electric vehicle in step a). In one particularly simple implementation of this variant, an IP address assigned to the charging control unit is immediately transmitted to the electric vehicle in step a) and is then directly used to set up IP-based communication.

In another variant of the method according to the invention, the identification transmitted to the electric vehicle in step a) is not an IP address, but rather the corresponding IP address must be determined separately on the basis of the transmitted identification and must be made available to the electric vehicle. In one variant of the invention, the IP address is determined in such a manner that the electric vehicle sends the identification transmitted in step a) to the charging control unit via the second communications connection, for example using a broadcast, whereupon the charging control unit, to which this identification is assigned, (solely) determines the corresponding IP address from the identification and transmits it to the electric vehicle via the second communications connection. Additionally or alternatively, it is also possible for the electric vehicle to determine an intermediate address from the identification transmitted in step a) and to send it to the charging control unit via the second communications connection, for example using a broadcast, whereupon the charging control unit, to which the identification is assigned, (solely) determines the corresponding IP address from the intermediate address and transmits it to the electric vehicle via the second communications connection.

In another modification of the method according to the invention, it is also possible to dispense with transmitting the identification or the intermediate address from the vehicle to the charging control unit. In this case, the charging control unit, without being asked, sends a message containing the assignment of the identification or an intermediate address, from which the electric vehicle can derive the identification, to the corresponding IP address of the charging control unit via the second communications connection, for example again based on a broadcast. The electric vehicle which has previously received the identification in step a) then (solely) gathers the IP address from the message and uses it to set up IP-based communication.

In another variant of the method according to the invention, the charging control unit not only transmits the identification to the electric vehicle in step a) but the electric vehicle also transmits the identification to the charging control unit, in which case, after the identification has been sent to the charging control unit by the electric vehicle via the second communications connection, the charging control unit checks whether the identification received by it via the second communications connection matches the identification previously received from the electric vehicle in step a), in which case the method is continued only in the event of a match. This increases the security of the method.

The identification provided in step a) of the method according to the invention or the intermediate address can have any desired configuration. In particular, the identification or the intermediate address may have a proprietary format, for example in the form of a token. The identification or intermediate address may likewise be a MAC address (MAC=Medium Access Control) or a URL (URL=Uniform Resource Locator) or a cryptographic key.

If the identification or intermediate address is a MAC address, the electric vehicle can be informed of the corresponding IP address via the second communications connection using mechanisms which are known per se. In particular, Neighbor Discovery according to the document RFC 4861 and/or Inverse Neighbor Discovery according to the document RFC 3122 of the IETF (IETF=Internet Engineering Task Force) can be used. These mechanisms are defined for IPv6.

In another refinement of the method according to the invention, the identification provided via the first communications connection also contains an item of key information which is used to encrypt and verify data during communication between the electric vehicle and the charging control unit. This makes it possible to increase the security of the method with respect to third-party attacks.

In addition to the method described above, the invention also comprises a system for establishing an IP-based communications connection. In this case, the system comprises an electric vehicle and a charging station with an assigned charging control unit, an IP address being assigned to the charging control unit. The system is configured in such a manner that the method according to the invention or one or more variants of the method according to the invention can be carried out using the system. For this purpose, the system comprises a first means for providing the electric vehicle and the charging control unit with an identification via the first communications connection defined above. A second means is also provided in order to allocate an IP address to the electric vehicle. In addition, a third means is provided in order to set up IP-based communication between the electric vehicle and the charging control unit via the second communications connection with the aid of the IP address allocated to the electric vehicle and the identification provided via the first communications connection.

The invention also relates to an electric vehicle for use in such a system. In this case, the vehicle comprises an interface for the first communications connection and an interface for the second communications connection, the electric vehicle being able to communicate via the first and second communications connections in such a manner that IP-based communication is set up between the electric vehicle and the charging control unit via the second communications connection.

In a similar manner, the invention also relates to a charging station with an assigned charging control unit for use in the system described above. In this case, in a manner similar to the electric vehicle, the charging station comprises an interface for the first communications connection and an interface for the second communications connection, the charging station being able to communicate via the first and second communications connections in such a manner that IP-based communication is set up between the electric vehicle and the charging control unit via the second communications connection.

Examplary embodiments of the invention are described in detail below using the accompanying figures.

Exemplary embodiments of the invention are described in detail below using the accompanying figures, in which:

DESCRIPTION OF THE INVENTION

Figure 1:
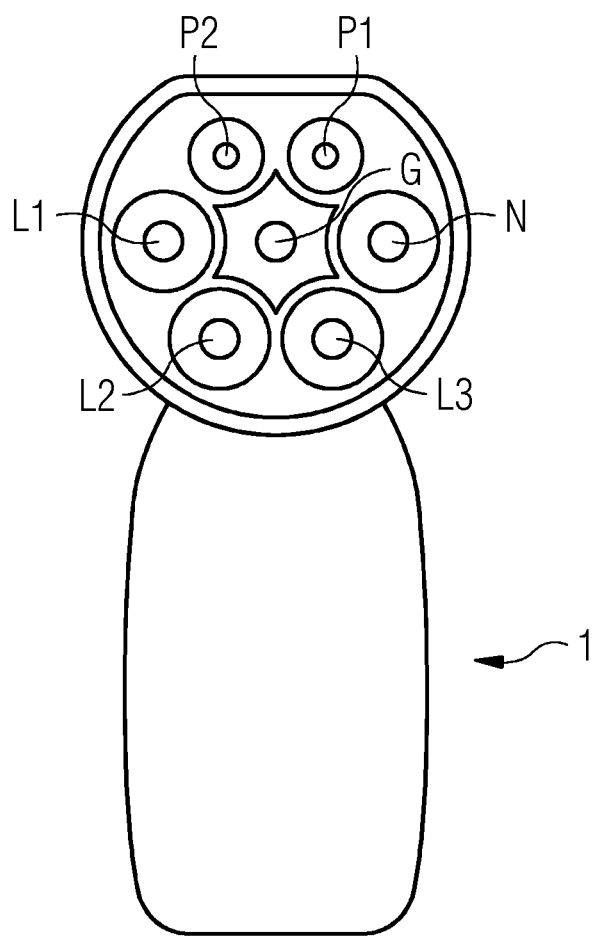
FIG. 1 shows a schematic illustration of the structure of the connector of a charging cable for connecting an electric vehicle to a charging station, the IP-based communications connection being established via this connector and the charging cable in one embodiment of the method according to the invention.

The invention is described below on the basis of a connection between an electric vehicle and a charging station via a charging cable, the connector of which is represented in FIG. 1. The connector 1 shown in plan view is standardized and comprises a multiplicity of connections for corresponding lines in the charging cable. In particular, the connector contains three pins for current-carrying lines L1, L2 and L3 and a zero conductor pin N and a grounding pin G. A three-phase charging current is carried from the charging station to a corresponding battery of the electric vehicle and the battery is discharged via these pins. In the embodiment described here, one of the current-carrying lines L1 to L3 is also used to interchange data on the basis of PLC communication. This is used to create the second communications connection in the sense of the patent claims. The connector 1 in FIG. 1 also comprises a control pin P1, which is also referred to as a pilot pin, and a further pin P2 which is used to detect, using an electrical resistance, whether the connector 1 has been plugged into a corresponding socket in the charging station. The pin P2 can be used together with the grounding conductor G, for example, to activate the immobilizer of the vehicle. Basic information which is required during the charging operation is transmitted via the pin P1. In particular, the information relating to whether the connector 1 has been plugged into the charging station is transmitted, this information having been determined via the pin P2. In addition, the pin P1 is used to interchange basic information.

The control pin P1 is used to create the first communications connection between the electric vehicle and the charging station in the sense of the patent claims via a pilot line in the charging cable. Information is transmitted via this communications connection on the basis of pulse width modulation. In this case, corresponding vehicle states are transmitted to the charging station via voltage levels of the PWM signal. In contrast, the charging station transmits information to the vehicle using the duty factor of the pulse width modulation and using modulation of the low level of the PWM signal. In this case, information transmission on the basis of pulse width modulation is known per se from the prior art and is described, in particular, in Part 1 of the ISO/IEC 61851 standard which is still in development. In the embodiment described here, a corresponding identification of a charging control unit is also transmitted using the PWM signal. The transmission of such an identification using the PWM signal is described in the German patent application 10 2009 051 401.5 already mentioned above.

In the embodiments described below, the charging control unit which communicates with the electric vehicle is integrated in the charging station, with the result that communication between the electric vehicle and the charging control unit can be equated with communication between the electric vehicle and the charging station. The two terms are therefore used synonymously below.

During charging of the electric vehicle, a multiplicity of items of information, which are needed, for example, to invoice the vehicle owner for the charging current consumed, are transmitted between the electric vehicle and the charging station. On account of the amount of information, it is no longer possible to transmit this information solely using the PWM signal. PLC communication (already mentioned above) via the current-carrying lines L1, L2 and L3 is therefore used. However, in contrast to the transmission of the PWM signal via the pilot line, there is the problem in this case of there being no unique association between the electric vehicle and the charging station. In particular, strong crosstalk effects may arise during PLC communication when using a plurality of cables at different charging connections. Therefore, it cannot be assumed that it is possible to reliably determine, with the aid of signal level analysis, whether the received signals belong to a particular charging connection. Communication between electric vehicles and charging stations is therefore comparable to a "shared medium" which is jointly used by a plurality of connections. An electric vehicle can therefore possibly see a plurality of charging stations in its communication environment via the PLC connection. In a similar manner, a charging station may possibly also see a plurality of electric vehicles in its communication environment.

FIGS. 2 to 5 show different variants of the method according to the invention which is used to ensure that a uniquely allocatable end-to-end connection can also be established using PLC communication for the purpose of interchanging data between an electric vehicle and a charging station.

In FIGS. 2 to 5, the reference symbol EV is used to denote an electric vehicle which is connected to a charging station EVSE1 (EVSE=Electric Vehicle Supply Equipment, also referred to as charging post) via a charging cable with the connector according to FIG. 1. In this case, the charging station EVSE1 comprises a charging control unit CS1 (CS=Charging Service) which is used to control and monitor the charging operation. In particular, the charging control unit comprises a current consumption meter for measuring the current drawn during the charging operation. Since the charging control unit is integrated in the charging station in the following embodiments, the terms "charging station" and "charging control unit" are used synonymously. However, if necessary, it is also possible for the charging control unit which is used to monitor the charging of the electric vehicle to be arranged away from the charging station or for a different charging control unit to be used for charging as an alternative to the charging control unit CS1. In this case, a charging infrastructure denoted CI is used to ensure that charging control units arranged away from the charging station EVSE1 can also communicate with the charging station and can communicate with the electric vehicle EV via the charging connection.

Figure 2:
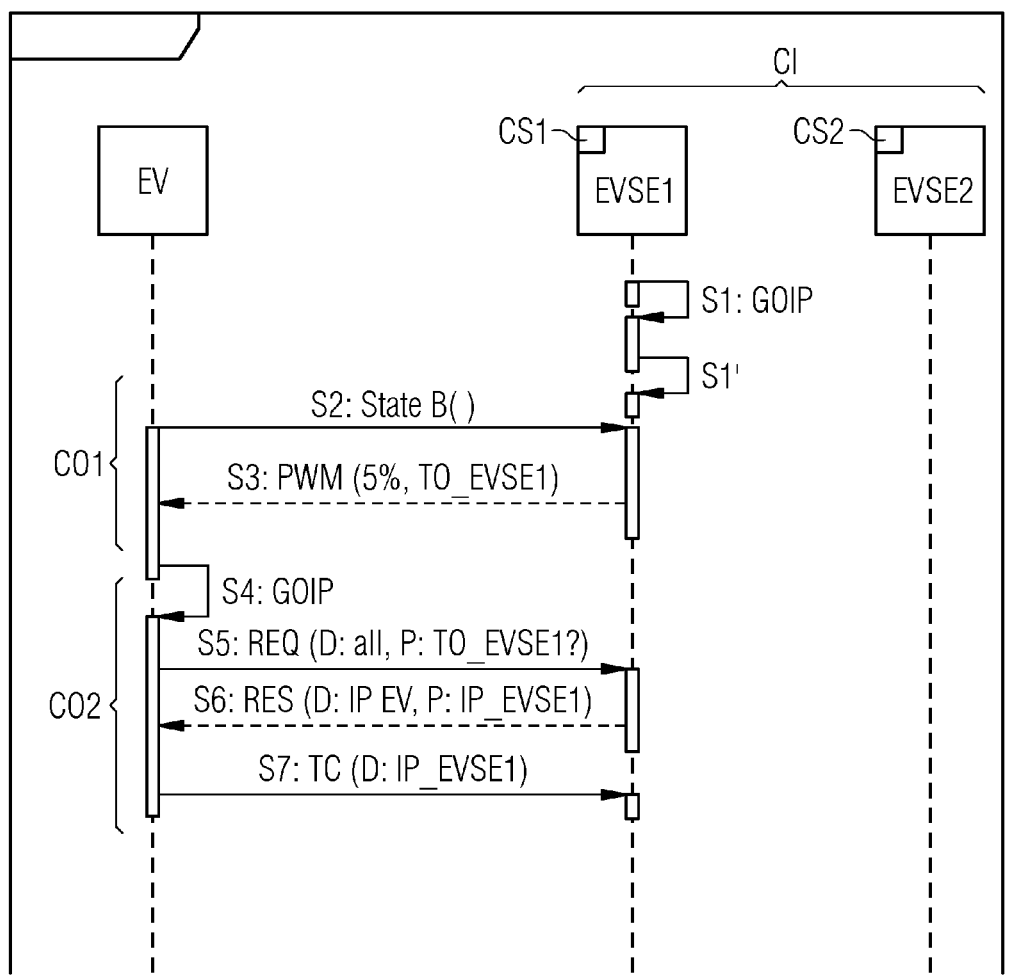
FIGS. 2 to 5 show flowcharts illustrating different embodiments of the method according to the invention.

In addition to the charging station EVSE1, FIG. 2 also shows a further charging station EVSE2 with an assigned charging control unit CS2 which, however, is not used for communication within the scope of the description of the method. The further charging station is used to illustrate that the charging stations are part of a larger infrastructure CI comprising a multiplicity of charging stations. In this case, the charging station EVSE2 may be arranged, for example, adjacent to the charging station EVSE1 in a public area, for example a parking garage.

The charging infrastructure CI overall forms a communication network and also comprises further communication components which are not shown in the following figures. In this case, the communication network is IP-based, and corresponding servers, in particular a DHCP server and a DNS server, which are used during IP-based communication are provided in the communication network as further components. In the embodiments in FIGS. 2 to 5, the first communications connection set up using the pilot line of the charging cable is denoted CO1. In contrast, PLC communication on a current-carrying line in the charging cable is denoted CO2.

As already mentioned, the second communications connection CO2 cannot always be uniquely assigned to the electric vehicle and the charging station or charging post connected thereto on account of crosstalk effects. If, for example, the two charging stations EVSE1 and EVSE2 are arranged adjacent to one another and electric vehicles are connected to both charging stations, the situation may arise, without a unique association between the electric vehicle and the charging station, in which an electric vehicle is assigned a charging station at which the other electric vehicle is arranged, with the result that the wrong current meter is assigned to the vehicle and the vehicle owner is therefore no longer correctly invoiced for the current. Such situations are avoided by the embodiments of the method according to the invention which are described below.

In all of the following embodiments, the designation "GOIP" is used to denote a mechanism for obtaining an IP address, in which case recourse is had to mechanisms known per se in the embodiment described here. In particular, the IP address is obtained using DHCP (DHCP=Dynamic Host Configuration Protocol). In this case, the unit wishing to receive an IP address communicates with a DHCP server (not shown) in the infrastructure CI. The corresponding IP address is then allocated using commands which are known per se in the form of DHCP-Discover, DHCP-Offer, DHCP-Request and DHCP-Ack. In this case, a DHCP client is started on the corresponding component wishing to obtain an address and this client communicates with the corresponding DHCP server via a relay. In addition, in the following figures, the practice of setting up IP-based communication between the electric vehicle EV and the charging station EVSE1 is denoted TC (TC=TCP Connect). This is the TCP/TLS set-up which is known per se and is used by the electric vehicle EV to establish IP communication with the charging station EVSE1 using the unicast method.

In the following figures, the reference symbol "D" also denotes the destination of a message and the reference symbol "P" denotes the payload. Furthermore, a question mark after the corresponding identification is used to indicate that this identification is requested. The designation "all" is used to convey the fact that the message is a broadcast message without a specific recipient. If this addition is not present, it is a unicast message which is used to address a particular recipient.

In the variant in FIG. 2, a corresponding IP address is first of all allocated to the charging station EVSE1 in step S1. A suitable server is then started in step S1' and is used to enable the IP address of the charging station EVSE1 to be communicated to the electric vehicle. The messages REQ and RES described further below are used for this purpose. Within the scope of the embodiment in FIG. 2, the electric vehicle EV first of all informs the charging station of its state in step S2 via the first communications connection. In FIG. 2 and also the following figures, the so-called "State B", which is known from Part 1 of the abovementioned ISO/IEC 61851 standard, is transmitted in this case as the state. This state is used to indicate that the vehicle is ready for charging. In step S3, the charging station then transmits a PWM signal with a duty factor of 5%, for example, which signal is used to indicate that a second broadband communications connection should also be set up between the vehicle and the charging station using PLC. An identification of the charging station in the form of a token, which is denoted TO_EVSE1, is also coded in the PWM signal in this case. In the embodiment in FIG. 2, the identification is not tied to a predefined standard. It must only be ensured that the identification is uniquely assigned to the charging station EVSE1. Communication then takes place via the second PLC communications connection CO2. In this case, this communications connection makes it possible to interchange data with the infrastructure CI. In step S4, in analogy to step S1, an IP address is first of all obtained and is allocated to the vehicle EV.

In the subsequent step S5, a request REQ is directed to the infrastructure CI using broadcast. The request comprises, as the source address, the IP address which is allocated in step S4 and is denoted IP_EV below. This request is used to look for that charging station to which the token TO_EVSE1 is assigned. The request reaches a multiplicity of charging stations in the charging infrastructure CI, but only that charging station to which the token TO_EVSE1 is assigned responds to the request. According to FIG. 2, this is the charging station EVSE1. The charging station EVSE1 then responds in step S6 with the response RES which is a unicast message with the destination address IP_EV. The message comprises the IP address IP_EVSE1 of the charging station as the payload. On the basis of steps S5 and S6, a request/response mechanism is therefore used to ensure that the electric vehicle EV receives the associated IP address of the charging station for the originally transmitted identification TO_EVSE1. On the basis of the knowledge of this IP address, IP-based communication can then be set up in step S7 in a manner known per se using a TCP/TLS set-up with the destination address IP_EVSE1 of the charging station. In this case, it is ensured, on account of the transmission of the token in step S3, that the electric vehicle is associated with that charging station to which the electric vehicle is connected via the charging cable.

The embodiment in FIG. 2 which has just been described can be modified in such a manner that, within the scope of the first communications connection CO1, the identification TO_EVSE1 is also transmitted from the electric vehicle to the charging station EVSE1 in a step S3' which follows step S3. Bidirectional communication between the electric vehicle and the charging station within the scope of the first communications connection is therefore implemented. Finally, in a subsequent step S5' which follows step S5, the charging station EVSE1 checks whether the identification TO_EVSE1 previously transmitted in step S5 matches the identification transmitted within the scope of the first communications connection in step S3'. The method is continued only if this is the case and otherwise an attack is detected. This refinement of the invention is advantageous since the PWM signal can typically be intercepted but cannot be manipulated from the outside. The charging control unit can use the identification transmitted or sent back by the vehicle in step S3' to ensure that a vehicle which has only concomitantly read the identification in step S3 does not respond, but rather only that vehicle which is connected to the charging cable and can influence the PWM signal responds.

The above-described variant of FIG. 2 can also be modified in such a manner that, in step S3, a corresponding identification is not transmitted from the charging station to the electric vehicle but rather from the electric vehicle to the charging station. In this case, the subsequent steps can again be carried out in an analogous manner since the identification TO_EVSE1 is known to the electric vehicle. However, if necessary, steps S5 and S6 may also be reversed in terms of their direction, that is to say the charging station EVSE1 sends a request for the identification TO_EVSE1 to the electric vehicle EV in step S5. In this case, this request furthermore also comprises the IP address of the charging station. Only the electric vehicle which contains the identification TO_EVSE1 then responds in step S6 with a corresponding response which it uses to transmit its IP address to the charging station EVSE1. Step S7 is then carried out in an analogous manner to that shown in FIG. 2. The above-described token TO_EVSE1 may possibly also be a public key of an asymmetrical encryption method, in which case the request is signed with the private key when transmitting the key in step S5.

Figure 3:
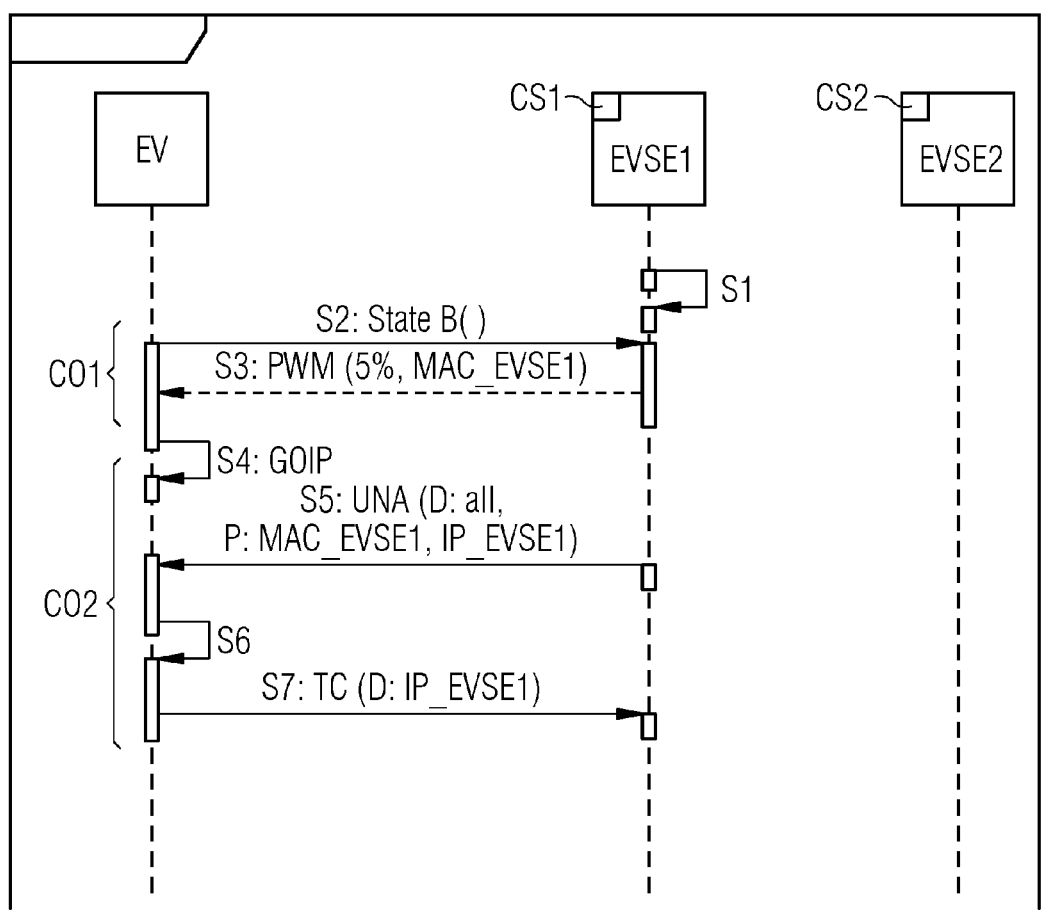

FIG. 3 shows a modification of the method in FIG. 2. In this case, steps S1 to S4 substantially correspond to the method steps in FIG. 2. However, in contrast to step S3 in FIG. 2, the PWM signal is now no longer used to transmit a token but rather the MAC address MAC_EVSE1 of the charging station EVSE1. This makes it possible to use standard mechanisms which are used to inform the vehicle of the IP address of the charging station EVSE1. In the embodiment in FIG. 3, this IP address is transmitted in a so-called "Unsolicited Neighbor Advertisement". In this case, communication based on IPv6 is set up and neighborhood detection based on the document RFC4861 of the IETF is carried out. According to FIG. 3, the abovementioned Unsolicited Neighbor Advertisement, which is denoted UNA, is sent as a broadcast from the charging station EVSE1 in step S5. This advertisement contains, as the payload, both the MAC address MAC_EVSE1 and the IP address IP_EVSE1, assigned to this MAC address, of the charging station. The Neighbor Advertisement is received by the electric vehicle EV via the second communications connection and is evaluated in step S6. In this case, the electric vehicle determines that the MAC address previously transmitted to it in step S3 matches the MAC address of the Unsolicited Neighbor Advertisement UNA. The electric vehicle discerns from this that the charging station connected to it via the charging cable has the IP address IP_EVSE1. In a similar manner to FIG. 2, IP-based communication is then set up in step S7 via unicast using a TCP/TLS set-up.

Figure 4:
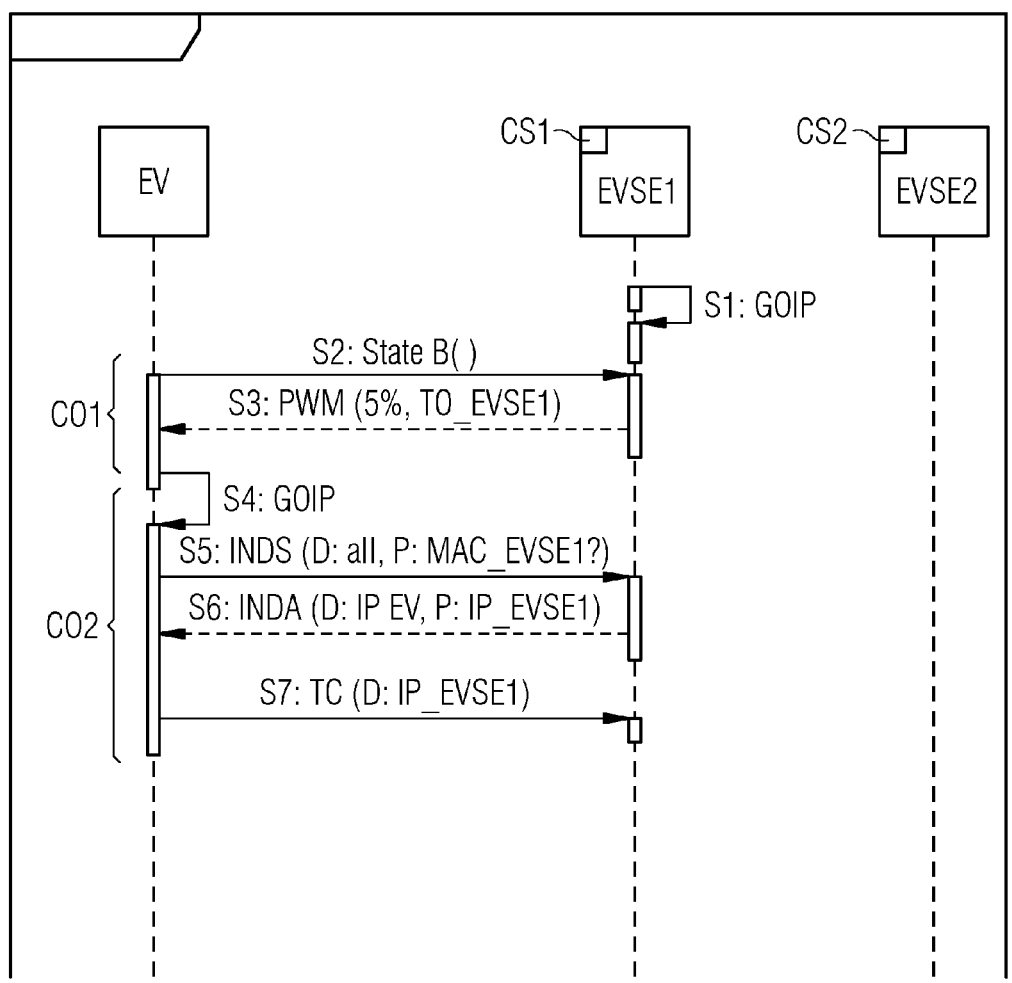

FIG. 4 shows a modification of the method in FIG. 3. In this case, in a similar manner to FIG. 3, the MAC address of the charging station EVSE1 is again transmitted to the electric vehicle EV in step S3. In order to inform the vehicle of the associated IP address IP_EVSE1, the IPv6-based Inverse Neighbor Discovery, which is defined in the document RFC3122 of the IETF, is now used. In this case, the vehicle EV first of all sends an IND Solicitation INDS (IND=Inverse Neighbor Discovery) to the infrastructure CI using broadcast in step S5, in which case the charging station with the MAC address MAC_EVSE1 previously transmitted in step S3 is searched for on the basis of this message. The charging station EVSE1 to which this MAC address is assigned then responds in step S6 with the message INDA which is an IND advertisement. This message is a unicast message which is addressed to the IP address IP_EV of the electric vehicle EV and contains the IP address IP_EVSE1 of the charging station EVSE1 as the payload. The electric vehicle EV thus receives the IP address of the charging station via step S6 and can then set up IP-based communication in step S7 using the TCP/TLS set-up.

Figure 5:
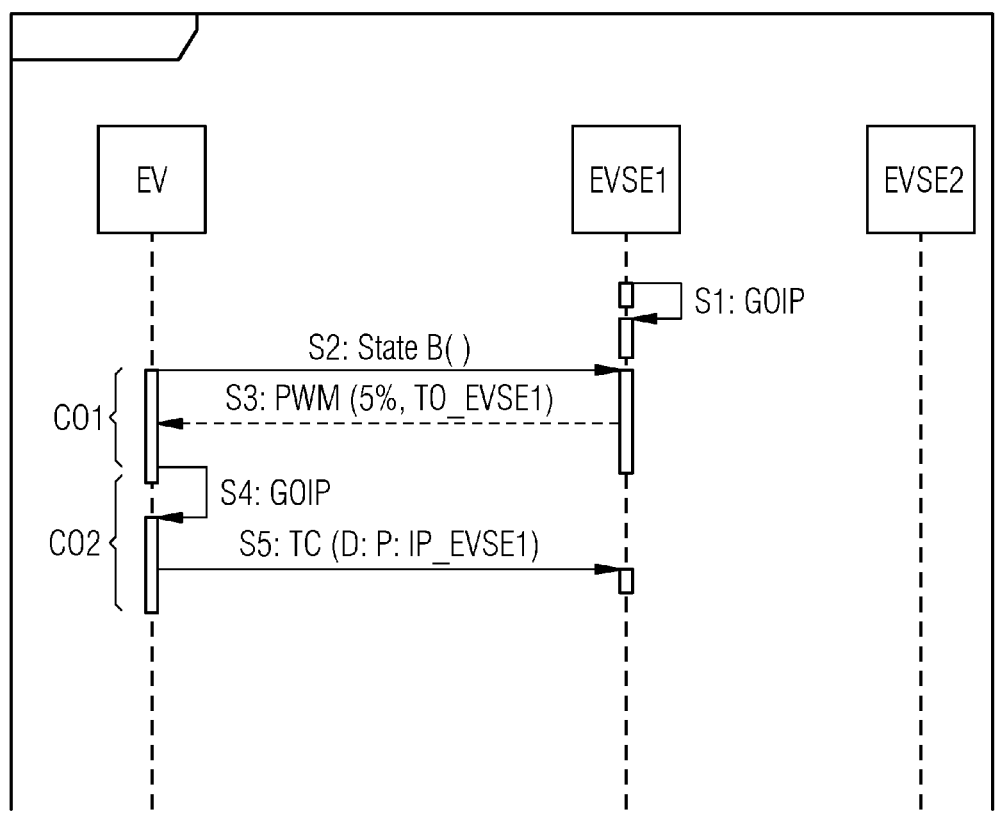

FIG. 5 shows another embodiment of the method according to the invention, which embodiment is simplified in comparison with the preceding embodiments in FIGS. 2 to 4. In this case, steps S1 to S4 correspond to steps S1 to S4 in the preceding figures with the only difference that, in step S3, the IP address IP_EVSE1 of the charging station EVSE1 is now transmitted directly. It is therefore no longer necessary to implement additional message transmission which is used to assign a token or a MAC address to the IP address of the charging station EVSE1. Rather, after an IP address has been allocated to the electric vehicle EV according to step S4, IP-based communication can be immediately set up in step S5 using a TCP/TLS set-up.

The embodiments of the method according to the invention which are described above have a number of advantages. In particular, a plurality of electric vehicles or charging stations can set up an IP connection in a parallel manner using PLC communication despite crosstalk. This is ensured by virtue of the fact that an identification of the charging station, which can be used to derive the IP address of the charging station, is transmitted via the first communications connection according to which a unique association between the vehicle and the connected charging station is ensured. In this case, the method enables the parallelization of a plurality of connection establishment requests from different electric vehicles or charging stations. In particular, sequences of a plurality of connection establishment requests may be interleaved. Furthermore, in the method according to the invention, it is possible to have recourse to standard mechanisms for address allocation, in particular DHCP and possibly also SLAAC, and to other known mechanisms such as the above-described Neighbor Discovery or Inverse Neighbor Discovery.

In modifications of the above-described method, a URL, for example, may also be transmitted as the identification inside the PWM signal. The use of a URL provides more flexibility. For example, the charging station can receive a different IP address without the URL changing. The URL can be mapped to the corresponding IP address using a standard DNS service (DNS=Domain Name System). The address of the DNS service and the required gateway can again be communicated using DHCP.

In another variant, it is also possible for the corresponding URL to be derived from the identification in the electric vehicle, for example using a suitable function. In the same manner, the IP address can also be directly determined from such an identification in the vehicle. In another variant, the identification may also contain key information. The electric vehicle can then use this key information to either verify the signed data from the charging station or to encrypt data which can be decoded only by that charging station which has previously sent the identification. Attacks on communication between the electric vehicle and the charging station are therefore made more difficult. For example, the charging station could send a public PGP key which is used by the electric vehicle to verify the signature or for encryption during communication. The charging station can then decode the information using its private key. Additional security can be achieved by virtue of the fact that a corresponding key pair is generated only for a charging operation or for establishing a connection only shortly before the relevant connection is established.

The invention claimed is:

1. A method for establishing an IP-based communications connection between an electric vehicle and a charging control unit assigned to a charging station and allocated an IP address, the charging control unit and the charging station being part of a charging infrastructure, the electric vehicle being connected to the charging station via a charging cable and/or inductive charge coupling for charging and/or discharging an energy store of the electric vehicle, a first communications connection used solely by the electric vehicle and the charging station being provided via the charging cable and/or the inductive charge coupling, and the electric vehicle being able to communicate with the charging control unit and the charging infrastructure via a second communications connection used in a parallel manner by other electric vehicles and other charging control units, which comprises the steps of:
   a) providing the electric vehicle and the charging control unit with an identification via the first communications connection, the first communications connection only being used for a transfer of communications data only between the electric vehicle and the charging control unit;
   b) allocating a further IP address to the electric vehicle; and
   c) setting up an IP-based communication between the electric vehicle and the charging control unit via the second communications connection with an aid of the further IP address allocated to the electric vehicle and the identification provided via the first communications connection.

2. The method according to claim 1, which further comprises performing step b) by allocating the further IP address to the electric vehicle by the charging infrastructure via the second communications connection and is transmitted to the electric vehicle.

3. The method according to claim 1, which further comprises integrating the charging control unit in the charging station.

4. The method according to claim 1, which further comprises providing the identification via the first communications connection on a basis of a pulse-width-modulated signal.

5. The method according to claim 1, which further comprises providing the first and second communications connections via a same line in the charging cable.

6. The method according to claim 1, wherein the second communications connection is a power line communications connection.

7. The method according to claim 1, which further comprises performing step b) by allocating the further IP address to the electric vehicle using at least one of a dynamic host configuration protocol or a stateless address auto configuration.

8. The method according to claim 1, which further comprises performing step a) by transmitting the identification from the electric vehicle to the charging control unit.

9. The method according to claim 8, which further comprises sending, via the electric vehicle, the identification transmitted to the charging control unit in step a) via the second communications connection, whereupon the charging control unit, upon receiving the identification, transmits the IP address to the electric vehicle, the IP address transmitted being used to set up the IP-based communication.

10. The method according to claim 8, which further comprises sending, via the charging control unit, the identification transmitted to the charging control unit in step a), together with the IP address, to the electric vehicle via the second communications connection, whereupon the electric vehicle transmits a response to the charging control unit, the IP address transmitted to the electric vehicle being used to set up the IP-based communication.

11. The method according to claim 1, which further comprises performing step a) by transmitting the identification from the charging control unit to the electric vehicle.

12. The method according to claim 11, wherein the identification is the IP address of the charging control unit which is used to set up the IP-based communication.

13. The method according to claim 11, which further comprises determining the IP address of the charging control unit on a basis of the identification transmitted to the electric vehicle in step a) and is made available to the electric vehicle, the IP address provided being used to set up the IP-based communication.

14. The method according to claim 13, which further comprises sending, via the electric vehicle, the identification transmitted to the electric vehicle in step a) to the charging control unit via the second communications connection, whereupon the charging control unit determines the IP address from the identification and transmits the IP address to the electric vehicle via the second communications connection.

15. The method according to claim 14, which further comprises transmitting in step a), via the electric vehicle, the identification to the charging control unit, in which case, after the identification has been sent to the charging control unit by the electric vehicle via the second communications connection, the charging control unit checks whether the identification received by the charging control unit via the second communications connection matches the identification previously received from the electric vehicle in step a), in which case the method is continued only in the event of a match.

16. The method according to claim 13, which further comprises determining, via the electric vehicle, an intermediate address from the identification transmitted to the electric vehicle in step a) and sends the intermediate address to the charging control unit via the second communications connection, whereupon the charging control unit determines the IP address from the intermediate address and transmits the IP address to the electric vehicle via the second communications connection.

17. The method according to claim 16, which further comprises providing the identification in step a) or the intermediate address as a token, a URL or a cryptographic key.

18. The method according to claim 16, which further comprises providing the identification in step a) or the intermediate address as a MAC address.

19. The method according to claim 18, which further comprises transmitting the IP address of the charging control unit to the electric vehicle on a basis of a MAC address via the second communications connection using at least one of Neighbor Discovery or Inverse Neighbor Discovery.

20. The method according to claim 13, which further comprises sending, via the charging control unit, without being asked, a message containing an assignment of the identification or an intermediate address, from which the electric vehicle can derive the identification, to the IP address of the charging control unit via the second communications connection, whereupon the electric vehicle gathers the IP address from the message.

21. The method according to claim 1, which further comprises providing the identification in step a) to contain an item of key information which is used to encrypt or verify data during communication between the electric vehicle and the charging control unit.

22. The method according to claim 1, wherein the second communications connection is a PLC communications connection in a current-carrying line of the charging cable or in a line in the charging cable which is used to transmit the identification via the first communications connection on a basis of a pulse-width-modulated signal.

23. A system for establishing an IP-based communications connection between an electric vehicle having an energy store and a charging station having an assigned charging control unit, an IP address being allocated to the charging control unit, the charging control unit and the charging station being part of a charging infrastructure, the electric vehicle being able to be connected to the charging station via at least one of a charging cable or an inductive charge coupling for charging and/or discharging the energy store of the electric vehicle, the system comprising:
  first and second communication connections, said first communications connection for use solely by the electric vehicle and the charging station for transmitting only communications data, the electric vehicle being able to communicate with the charging control unit and the charging infrastructure via said second communications connection which can be used in a parallel manner by other electric vehicles and charging control units;
  first means for providing the electric vehicle and the charging control unit with an identification via the first communications connection;
  second means for allocating a further IP address to the electric vehicle; and
  third means for setting up IP-based communication between the electric vehicle and the charging control unit via the second communications connection with an aid of the further IP address allocated to the electric vehicle and the identification provided via the first communications connection.

24. The system according to claim 23, wherein the system is programmed to carry out the method according to claim 2.

25. An electric vehicle for connecting to a charging station via at least one of a charging cable or an inductive charge coupling for at least one of charging or discharging an energy store of the electric vehicle, the electric vehicle comprising:
  the energy store;
  a first interface for a first communications connection used solely by the electric vehicle and the charging station and being provided via at least one of the charging cable or the inductive charge coupling, said first communications connection providing the electric vehicle and a charging control unit of the charging station with an identification, said first communications connection only being used for a transfer of communications data only between the electric vehicle and the charging control unit; and
  a second interface for a second communications connection to be used in a parallel manner by other electric vehicles and other charging control units, said second communications connection used by the electric vehicle to communicate with the charging control unit and the charging station, the electric vehicle being allocated an IP address and being able to communicate via the first and second communications connections in such a manner that IP-based communication is set up between the electric vehicle and the charging control unit via the second communications connection, with an aid of the IP address allocated to the electric vehicle and the identification provided via the first communications connection.

26. A charging station for establishing an IP-based communications connection to an electric vehicle having an energy store, the charging station comprising:

at least one of a charging cable or an inductive charge coupling for at least one of charging or discharging the energy store of the electric vehicle, said at least one charging cable or said inductive charge couple functioning as an interface for a first communications connection, said first communications connection providing the electric vehicle and said charging control unit with an identification, said first communications connection only being used for a transfer of communications data only between the electric vehicle and said charging control unit;

a charging control unit having an IP address; and an interface for a second communications connection to be used in a parallel manner by other electric vehicles and other charging control units, said second communications connection used by the electric vehicle to communicate with said charging control unit and the charging station, the charging station being able to communicate via the first and second communications connections in such a manner that IP-based communication is set up between the electric vehicle and said charging control unit via the second communications connection, with an aid of the IP address and the identification provided via said first communications connection.

* * * * *